Aug. 18, 1936.                J. K. MORRISON                 2,051,643
                                CLOTH HOUSE
                           Filed April 14, 1936
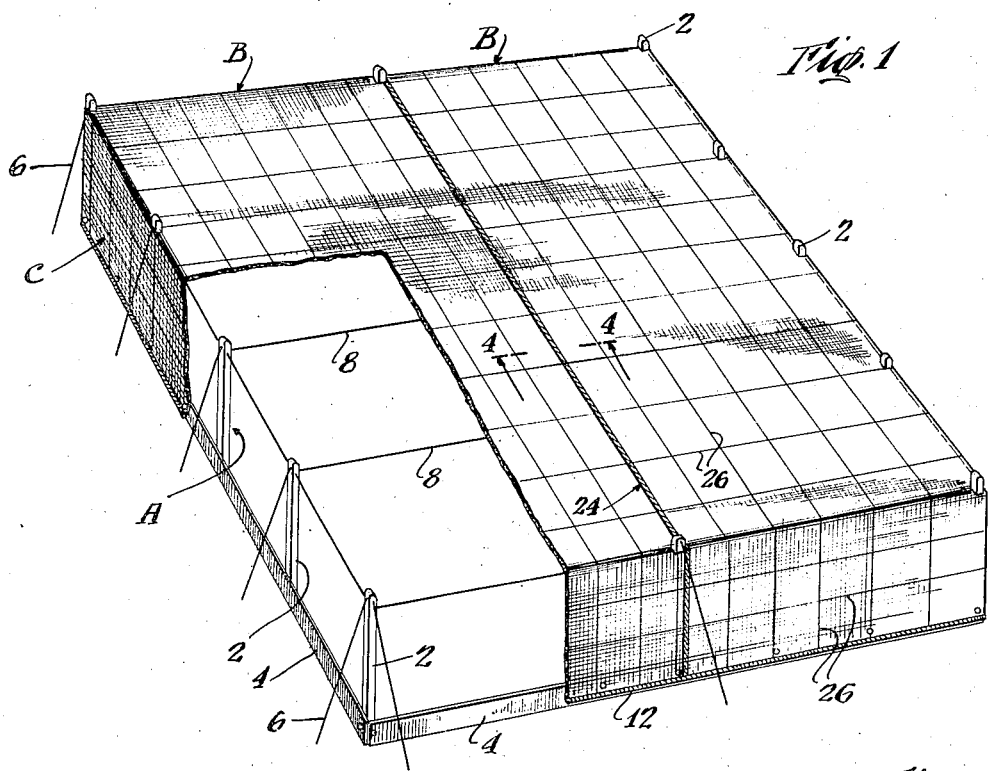
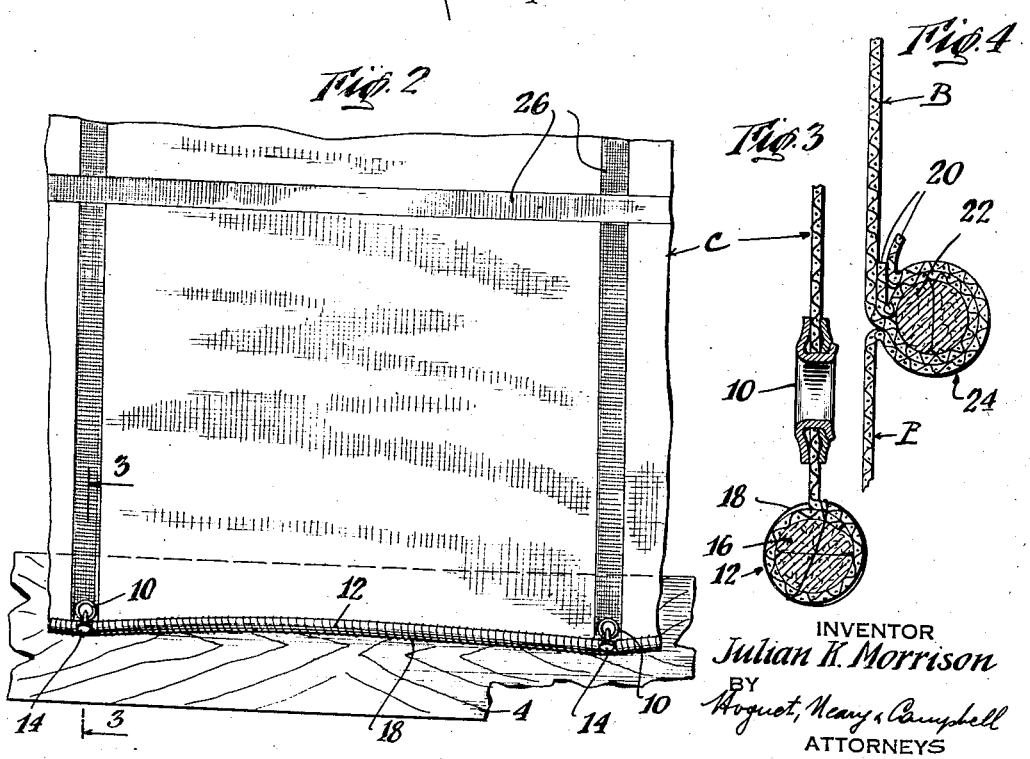
INVENTOR
Julian K. Morrison
BY
Hoquet, Neary & Campbell
ATTORNEYS Patented Aug. 18, 1936

2,051,643

UNITED STATES PATENT OFFICE 2,051,643

CLOTH HOUSE

Julian K. Morrison, Rome, Ga., assignor to Southern Brighton Mills, Shannon, Ga., a corporation of Georgia Application April 14, 1936, Serial No. 74,236

11 Claims. (Cl. 47—28)

The present invention relates to improvements in fabric houses used for protecting plants such as flowers, shrubs, tobacco, etc.

It has been customary for farmers and florists engaged in the outdoor growing of plants to provide for the plant beds coverings consisting of large strips of cloth supported on a frame work and completely enclosing the bed. These cloth houses protect the plants from insect pests and also from damage by natural forces, such as wind storms and hail.

The cloth used is of netlike weave and therefore permits sunlight to pass through to the plants but prevents entry of insects. The netlike fabric used in constructing the covering for the house framework is woven in narrow strips of any desired length and is usually provided with strip-like more closely woven portions and tape-selvedge edges.

Cloth houses are usually made by stitching overlapping selvedge edges of strips of material together to produce a single strip of the final desired width. Side walls are also sewed to the wide strip to form a substantially box-like construction. The cloth house is suspended on posts and wires and the edges are attached to a wooden baseboard which extends around the entire tract of land by means of laths nailed on the outer side of the fabric. The plant beds enclosed in cloth houses often are of two hundred acres in extent and the quantity of cloth used for covering them is so great that loss or deterioration of the same is a great financial burden to the owner.

The principal cause of deterioration of the houses is rotting or moulding of the cloth. The cloth being retained between the baseboard and the lath does not have free access to the air at this point and when once wetted retains the moisture causing the fabric to rot. As it is customary to water the plants as often as twice a day, wetting of the nets is unavoidable, particularly at the junction of the baseboard and the fabric.

A second cause of destruction of the houses is the wind. The roof and walls are attached to the wires and baseboard of the frame but the unsupported portions which are located between the points of attachment will billow with puffs of wind and thus will often be overstrained and torn. When the edge portions are weakened by rotting or moulding, they may be torn away from the baseboard. As the walls act in the nature, also of a windbreak, their detachment permits the wind to act even more strongly on the top and may then seriously damage it.

Usually the houses are provided with flap entrances at opposite ends, only, and sometimes with but one entrance. In a house covering several acres, and containing a large number of plant beds having only narrow paths between them, the necessary distribution of fertilizer and access to a particular bed for cultivation thus becomes a complicated problem. Also these entrances are troublesome and costly to construct, and there is always danger of their being left open by a careless workman, thereby permitting entry of insects.

The present invention is directed to a simplified construction which has been found to greatly increase the life of such cloth houses and renders access to their interiors much easier. Essentially, the improvement resides in the means of attachment and the combination of reinforcements at the edges and at the seams of the top of the house which strengthen the entire structure and which carry substantially all of the major stresses to which the fabric is subjected.

The reinforced edge has been so constructed that the use of laths for applying the edges to the baseboard is eliminated and losses through rotting of the fabric largely avoided. With the improved construction the edges may be attached or detached as desired. This overcomes the disadvantage of providing the house with a plurality of entrances, which necessarily complicate the construction of the covering and reduce its plant protection value. By merely detaching the edge of the house from the baseboard, the workmen or even trucks may have ready access to the interior of the house, without the necessity of going through the entire length of the house to gain entry to a particular group of plants.

With the foregoing in mind, for a better understanding of the structural features of the improved cloth house, reference may be had to the accompanying drawing, in which:

Figure 1 is a perspective view of my improved net, partly broken away, as applied to a supporting framework;

Figure 2 is a detail view of a section of my net;

Figure 3 is an enlarged sectional view of the edge of my net taken on line 3—3 of Figure 2, and Figure 4 is an enlarged view in section taken on line 4—4 of Figure 1.

Illustrative of one embodiment of my invention, Figure 1 discloses a framework A which is made up of a plurality of posts 2, spaced around the perimeter of the tract to be covered, the ends of the posts 2 being embedded in the ground. Baseboards 4 extend entirely around the tract, and may be nailed to the posts 2. The posts 2 are strengthened by means of guy wires 6 and a network of overhead net-supporting wires 8.

The top of the cloth house is made up of one or more strips of cloth generally indicated as B, supplied in widths of approximately 400 inches and of any desired length. Each of the strips B is made up of a plurality of narrow strips having either tape or wire selvedge edges which have been attached to each other preferably by over-edge stitching encircling adjacent selvedges. These strips may be connected after the fashion described in the patent to Kelly No. 2,028,220 or by stitching tape selvedges together. Small cloth houses are approximately thirty-three feet wide, and therefore one section B of the cloth will form a complete top. For greater widths of plant beds, the necessary number of strips may be joined to produce multiples of about 400 inches. When the strips B have been assembled to produce the completed top, side walls C are sewed to the edges of the top.

To avoid the necessity of attaching the edges of the side walls C to baseboard 4 by means of laths, as has heretofore been the usual procedure, grommets 10 are inserted along the edge 12 at intervals, preferably in or adjacent to more closely interwoven portions of the net. The grommets 10 hold the lower edge 12 of the side walls C firmly to the baseboard 4 by hooking them over nails 14 driven into the baseboard 4. To gain entry into the house, it is only necessary to unhook the grommets from the nails and lift the side walls C at any point around the entire tract.

As a further strengthening means for the side-walls C a reinforcing cord or rope 16 is rolled in the edge 12 adjacent the grommets 10 and is bound into the edge permanently by loop-stitching 18 encircling the cord 16 and rolled edge 12. The reinforced edge not only prevents the grommets 10 from tearing out of the net but also serves as a means for maintaining the dimensions of the net constant. In addition if a grommet 10 should become battered or bent, so that a nail could not pass through it, the nail can be driven through the net itself and the reinforcing cord 16 will prevent the nail from tearing out of the edge.

A further feature of my cloth house, when it is used for covering and protecting large tracts of land, for example against hail, is the addition to the seams in the top of reinforcing means similar to that at the edge of the net. When the top sections are of great length and width, as for example the tops of houses of the type used in connection with the cultivation of tobacco in Connecticut, which sometimes cover two hundred acres, large stresses are set up in the net even by light winds. As shown in Figure 4, to reinforce the entire top formed by strips B and the sections not supported by wires 8, the adjacent edges 20 of sections B are rolled around a cord or rope 22 and over-edge stitched to hold the rope firmly as a part of the seam 24. The reinforced seam 24 is then attached in any desired manner to the overhead wires 8 and carries the stresses set up throughout the extent of the net, thereby effectively preventing the net from being "exploded" or entirely torn away.

Nets of the type described are made of a material having reinforced portions 26 woven into the material. The edges of the strips are usually provided with tape selvedges which are woven similarly to the reinforced portions 26. The joined edges of the narrow strips making up the strips B and the sidewalls C, may, however, be wire-selvedges, and may be joined after the fashion disclosed in Kelly Patent No. 2,028,220. In locating the grommets 10, it is preferable to place them in the reinforced portions 26 as they then are best situated to carry the stresses set up in the nets.

It will thus be understood that my improved net is a most convenient means for covering plant beds. It is easily installed, and equally easy to remove.

In view of the freedom from moisture retaining attaching means, the serviceable life of the nets has been increased and is in this sense exceedingly economical.

It will be understood that the nets may be reinforced wherever it may be found necessary, in accordance with the service conditions under which they are used and that the number and location of the reinforcements disclosed in my illustrated example should not be considered, therefore, as limiting the invention defined in the appended claims.

I claim:
1. In combination with a framework surrounding a tract of land, a net supported on the framework and reinforced edges on the net consisting of a cord rolled in the edge and attached thereto by stitching.

2. In combination with a framework comprising upright posts and a baseboard surrounding a tract of land; a net supported on the posts, sidewalls on the net, means for attaching the side walls to the baseboard comprising grommets spaced along the sidewall and a reinforced edge adjacent the grommets comprising a cord stitched in the edge.

3. A cloth house for protecting plant life comprising a top, sidewalls attached thereto, edges on the sidewalls and means reinforcing the edges comprising cords enclosed in the edges and attached thereto by stitching.

4. A cloth house for protecting plant life comprising a plurality of strips of net-like material joined at their adjacent edges to produce a single strip, and reinforcing means at a joined edge, comprising a cord rolled in the adjacent edges of two strips, and attached thereto by stitching.

5. A cloth house comprising a top, consisting of a plurality of strips of fabric connected by seams, a reinforcing cord in at least one of the seams, sidewalls attached to the top, and a reinforced edge on the sidewalls comprising a cord stitched to the edge.

6. A sidewall for a cloth house comprising a strip of net-like cloth, a tape selvedge edge on the cloth and a cord enclosed in the selvedge edge and attached thereto by stitching.

7. A sidewall for a cloth house comprising a strip of fabric, closely woven reinforcing strips in the fabric, a tape selvedge edge on the fabric, grommets in the reinforcing strips and adjacent the tape selvedge edge and a cord stitched in the selvedge edge.

8. A sidewall for a cloth house comprising a strip of fabric, closely woven reinforcing strips in the fabric, a tape selvedge edge on the fabric and grommets in the reinforcing strips adjacent the tape selvedge edge to allow ready attachment and detachment from a supporting structure.

9. A sidewall for a cloth house comprising a strip of fabric, closely woven reinforcing strips in the fabric, a tape selvedge edge on the fabric and a reinforcing cord attached to the selvedge edge for reinforcing the edge of the sidewall and maintaining it against change in dimensions.

10. A cloth house comprising a top, consisting of a plurality of strips of fabric connected by seams, sidewalls attached to the top having closely woven reinforcing strips therein, selvedge edges on the sidewalls and grommets in the reinforcing strips adjacent the selvedge edges.

11. A protective covering for plants, comprising a plurality of strips of fabric joined at their adjacent edges to produce a single wide strip, and a reinforcing cord extending along and attached to one of the joined edges adapted to carry and distribute the stresses set up in the covering by external forces.

JULIAN K. MORRISON.